US006549612B2

United States Patent
Gifford et al.

(10) Patent No.: US 6,549,612 B2
(45) Date of Patent: Apr. 15, 2003

(54) UNIFIED COMMUNICATION SERVICES VIA E-MAIL

(75) Inventors: Warren S. Gifford, Holmdel, NJ (US); Paul Mowatt, Piscataway, NJ (US); Philip Karcher, Spring Lake Heights, NJ (US); Domenico Riggi, Cranford, NJ (US)

(73) Assignee: Telecommunications Premium Services, Inc., Edison, NJ (US)

( * ) Notice: Subject to any disclaimer, the term of this patent is extended or adjusted under 35 U.S.C. 154(b) by 0 days.

(21) Appl. No.: 09/304,258

(22) Filed: May 6, 1999

(65) Prior Publication Data

US 2002/0131561 A1 Sep. 19, 2002

Related U.S. Application Data

(60) Provisional application No. 60/084,457, filed on May 6, 1998.

(51) Int. Cl.[7] .................................................. H04M 1/64
(52) U.S. Cl. ................. 379/67.1; 379/68; 379/88.04; 379/88.13; 379/88.17; 379/88.22; 379/908
(58) Field of Search .......................... 379/67.1, 88.13, 379/88.17, 88.18, 88.22, 265.69, 900, 908, 902, 68, 74, 76, 87, 88.04, 88.07, 88.11, 88.12, 88.19, 88.23, 88.25, 88.26

(56) References Cited

U.S. PATENT DOCUMENTS

| | | | | |
|---|---|---|---|---|
| 5,572,643 A | * | 11/1996 | Judson ........................ 395/793 |
| 5,652,789 A | * | 7/1997 | Miner et al. ................. 379/201 |
| 5,675,507 A | * | 10/1997 | Bobo, II ................. 395/200.36 |
| 5,732,216 A | * | 3/1998 | Logan et al. .......... 395/200.33 |
| 5,867,494 A | * | 2/1999 | Krishnaswamy et al. ... 370/352 |
| 5,884,262 A | * | 3/1999 | Wise et al. .................. 704/270 |
| 5,946,386 A | * | 8/1999 | Rogers et al. .............. 379/265 |

* cited by examiner

Primary Examiner—Allan Hoosain
(74) Attorney, Agent, or Firm—Oblon, Spivak, McClelland, Maier & Neustadt, P.C.

(57) ABSTRACT

A method and system for providing unified messages services to a subscriber. The subscriber utilizes an active interface embedded in an e-mail notification to control delivery of a non-literal, single media or multimedia message to the subscriber. Such a non-literal message includes, but is not limited to, any of a hyperlink-based message, a voicemail message, a facsimile, and a video clip. The active interface provides access to communications-related services as well, including access to stock/options trading and bill payment.

21 Claims, 6 Drawing Sheets

3 SECONDS OF URGENT VOICE MAIL

MESSAGE RECEIVED AT 9:18 am EST 5/5/98  TO: TOM DOE

201 — FROM: SANDRA JONES (7327675920)

LISTEN/VIEW    SAVE    DELETE    FORWARD    OPTIONS    HELP

CALLING SERVICES

PHONE # TO CALL: [    ]    YOUR PHONE #: [    ]

202 — RETURN THIS CALL    PLACE A CALL    CALL ME BACK NOW    LISTEN BY PHONE

SETUP A PHONE CONFERENCE

ALERT AND NOTIFICATIONS

203 — A LOCATION OVERRIDE OF 732-673-3942 IS IN PLACE UNTIL 10:00am EST
JOHN SMITH HAS LEFT YOU 5 MESSAGES SINCE 8:30am EST
COMPANY XYZ STOCK IS NOW TRADING AT $17/SHARE CLICK TO TRADE

SETUP AND CONFIGURATION

204 — OVERRIDES    PROFILE    LOGIN    LOGOUT

QUICK OVERRIDES

DURATION    PHONE NUMBER LOCATION

205 — [MAKE ME UNAVAILABLE NOW]   [ ]   [ ]
[SET NEW PHONE LOCATION]   [ ]
[TURN ON CALL SCREENING]

CURRENT TIME: 9:20am EST 5/5/98    MINI MESSAGE MANAGER

FIG. 2

UNIFIED COMMUNICATION SERVICES VIA E-MAIL

CROSS-REFERENCE TO RELATED CO-PENDING APPLICATION

The present application claims priority to provisional application Ser. No. 60/084,457 filed May 6, 1998. The present application is related to co-pending application Ser. No. 08/806,986, filed Feb. 26, 1997. The contents of both of those applications are incorporated herein by reference in their entirety.

BACKGROUND OF THE INVENTION

1. Field of the Invention

The present invention relates to a new computer-based messaging system, and in particular to a method and system for providing unified communication (UC) services over a local- or wide-area network. In one embodiment, those services are accessed from within an "Active" e-mail message which is sent to a subscriber of the services.

2. Description of the Background

A known method for sending a voice, fax, or video message from one user to another user over a local- or wide-area network is to attach the message to an e-mail as a passive data attachment. One such fax service believed to have been introduced in late 1998 or early 1999 is "efax" from efax.com which receives facsimiles and converts them to e-mail attachments. By launching a tool separately provided by efax.com, the attachments can be viewed.

Currently many e-mail client programs can read and display HTML e-mail directly in a window of the e-mail client program. Although some client programs do not support direct in-line viewing, most other e-mail client programs support opening the HTML e-mail as an attachment which can subsequently be viewed in an Internet Browser (e.g., Microsoft Explorer or Netscape Communicator).

A relatively new object oriented computer language called Java was developed by Sun Microsystems and has become an Internet-standard for developing small applications, called applets, that run in a common environment, such as a World Wide Web browser. These applets have the ability to utilize graphical user interface objects and communication objects that are provided through standard object classes. Java programming examples are described in *Java in a Nutshell: A Desktop Quick Reference for Java Programmers* by David Flannagan, and *Java AWT Reference* by John Zukowski, both of which are published by O'Reilly & Associates, Inc. and incorporated herein by reference. Java is also described in the Sun Microsystems Series of books published by Prentice Hall Books entitled *Core Java, Instant Java, Java by Example*, and *Just Java* by Cornell, Pew, Jackson and Van Der Linden, respectively, which are all incorporated herein by reference. Documents are also available which describe web techniques and programming. The contents of the Third Edition of "HTML Sourcebook" by Ian S. Graham, published by Wiley Publishing, and the Second Edition of "JavaScript" by David Flanagan, published by O'Reilly & Associates, Inc. are incorporated herein by reference. An additional Request for Comments that describes document formats that is incorporated herein by reference is: RFC 2068 entitled "Hypertext Transfer Protocol—HTTP/1.1". Similarly, "Wireless Application Protocol (WAP)—Wireless Markup Language (WML) Specification—Version 1.1" by the Wireless Application Protocol Forum, Ltd. and "A Technical Introduction to XML" by Norm Walsh. ArborText, Inc., 1998, are also incorporated herein by reference.

Documents are also available which describe electronic mail handling procedures. In particular, two Internet standards on e-mail are incorporated herein by reference in their entirety. They are: Internet STD014 entitled "MAIL ROUTING AND THE DOMAIN SYSTEM" (also known as RFC 974) and Internet STD0010 entitled "SIMPLE MAIL TRANSFER PROTOCOL" (also known as RFC 821). The contents of the Second Edition of "sendmail" by Bryan Costales and Eric Allman, published by O'Reilly Publishing, is also incorporated herein by reference. Additional Requests for Comments that describe mail formats that are incorporated herein by reference are: RFC 2045 Multipurpose Internet Mail Extensions (MIME) Part One: Format of Internet Message Bodies, November 1996; RFC 2046 Multipurpose Internet Mail Extensions (MIME) Part Two: Media Types, November 1996; RFC 2047 MIME (Multipurpose Internet Mail Extensions) Part Three: Message Header Extensions for Non-ASCII Text, November 1996, RFC 2048 Multipurpose Internet Mail Extensions (MIME) Part Four: Registration Procedures; November 1996; and RFC 2049 Multipurpose Internet Mail Extensions (MIME) Part Five: Conformance Criteria and Examples; November 1996.

SUMMARY OF THE INVENTION

The present invention sends an e-mail message including an active user interface to communicate with the unified communication services. This allows the recipient to not only listen and/or view the message, but also to respond to it through the interface. Using the features of the interface allows a subscriber to call or fax individuals and perform other functions directly from the interface within the e-mail. This method is quicker, easier, and more user friendly than known methods since it reduces the number of steps the individual needs to go through in order to respond to the message and/or perform related tasks. By interacting with the interface rather than the message itself, the actual message can remain stored on the server and is only retrieved when the subscriber desires to view/listen to its contents. The retrieval of voice, fax, and video data stored on the server can be done using streaming technology such that the user can listen and/or view the message while it is being downloaded.

An advantage of using an interface that is "limited" to a message is that the e-mailed message remains "lightweight" so that the interface portion of the message itself is only 2-10 kb in size, rather than potentially being much larger, especially for images, voice streams or data streams. That is, the notification message with the user interface is a substantially constant size for voicemails. The message is substantially independent of the size of the voicemail that it is linked to because only a link to the message is used. Similarly, the interface for faxes is substantially independent of the number of faxed pages received.

Within the interface itself, the present invention allows the individual to select whether the system should include a link to the message or the message itself, when sending e-mail to a subscriber. This allows greater flexibility for smaller messages that would benefit from including the smaller message with the interface.

Enriched E-mail as described herein is an e-mail message that has at least one of an HTML, WML, XML (or similar language) document attached thereto and which provides at least one user interface within the e-mail. Such an interface provides access to and/or control of a variety of online and offline services.

It is an object of the present invention to provide a unified communication service such that the service allows at least two services (e.g., voicemail, facsimile, and e-mail) to be combined into a single, distributable user interface.

It is a further object of the present invention to integrate services which allow a user to be tracked via the telephone using the same user interface that controls voicemail, facsimile, and e-mail.

These and other objects of the present invention are accomplished by providing a computer system that acts in conjunction with (1) a voice messaging system and (2) a digital communications network. The voice messaging system receives messages and provides access to those messages in digital form across the digital communications network. The digital communications network can be either a local area network or a wide-area network (e.g., the Internet). The messages can be delivered in either encrypted or non-encrypted format.

BRIEF DESCRIPTION OF THE DRAWINGS

A more complete appreciation of the invention and many of the attendant advantages thereof will be readily obtained by one of ordinary skill in the art as the same becomes better understood by reference to the following detailed description when considered in connection with the accompanying drawings, wherein:

FIG. 2 is a schematic illustration of an exemplary user interface according to the present invention;

DETAILED DESCRIPTION OF THE PREFERRED EMBODIMENT

Figure 1:
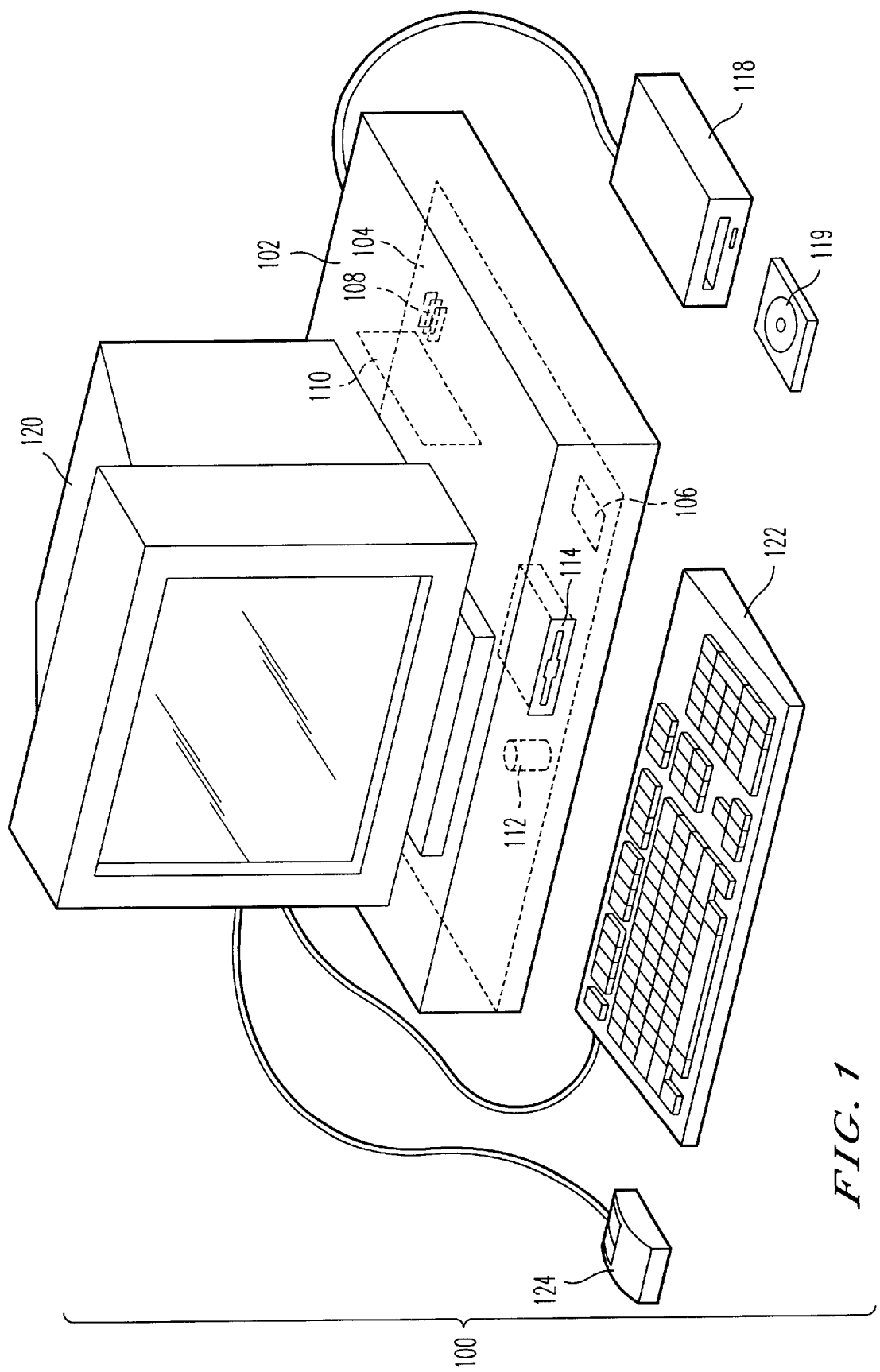
FIG. 1 is a schematic illustration of a computer system for implementing the method of the present invention.

Referring now to the drawings, wherein like reference numerals designate identical or corresponding parts throughout the several views, FIG. 1 is a schematic illustration of a computer system for implementing the method and system according to the present invention. The computer system 100 has a housing 102 which houses a motherboard 104 which contains a CPU 106 (e.g. Intel Pentium, Intel Pentium II, Dec Alpha, IBM/Motorola Power PC, memory 108 (e.g., DRAM, ROM, EPROM, EEPROM, SRAM and Flash RAM), and other optional special purpose logic devices (e.g., ASICs) or configurable logic devices (e.g., GAL and reprogrammable FPGA). The computer 100 further includes plural input devices, (e.g., a keyboard 122 and mouse 124), and a display card 110 for controlling monitor 120. In addition, the computer system 100 includes a floppy disk drive 114; other removable media devices (e.g., compact disc 119, tape, and removable magneto-optical media); and a hard disk 112, or other fixed, high density media drives, connected using an appropriate device bus (e.g., a SCSI bus or an Enhanced IDE bus). Although compact disc 119 is shown in a CD caddy, the compact disc 119 can be inserted directly into CD-ROM drives which do not require caddies. Also connected to the same device bus or another device bus as the high density media drives, the computer 100 may additionally include a compact disc reader 118, a compact disc reader/writer unit or a compact disc jukebox. In addition, a printer (not shown) also provides printed copies of messages received and interface customization procedures or files.

The computer system further includes at least one computer readable medium. Examples of such computer readable media are compact discs 119, hard disks 112, floppy disks, tape, magneto-optical disks, PROMs (EPROM, EEPROM, Flash EPROM), DRAM, SRAM. Stored on any one or on a combination of the computer readable media, the present invention includes software for controlling both the hardware of the computer 100 and for enabling the computer 100 to interact with a human user. Such software may include, but is not limited to, device drivers, operating systems and user applications, such as development tools and (graphical) system monitors. Such computer readable media further include a computer program, according to the present invention, for providing unified messaging. In addition, the software includes a program or programs (including device drivers) for interacting with a remote voice messaging service, telephone switches or bridges, and/or facsimile servers. Examples of known telephone bridges are 1) the LNX 2000 by Excel and 2) the SDS-500 by Summa Four Inc. The software can control the voice messaging services and switches under the control of the Unified Communications (UC) server of the present invention based on a user's interaction with his/her "active" e-mail.

Business applications for the present invention are not necessarily limited to telephony services. An enriched e-mail message that embeds a communications-aware (e.g., web-based) user interface delivers not only content to the user, but also gives the user the ability to respond, modify, or interact with that content at the moment it is received.

Three exemplary uses of the present invention are described below.

1. Stock/Options Interface

In one alternate embodiment of the present invention, a brokerage company maintains a registry of subscribers and options/stock price thresholds. When a stock or option price crosses corresponding threshold, the brokerage company sends an enriched e-mail notification to the corresponding client showing which stock or option crossed its threshold. The notification e-mail includes not only information on what triggered the e-mail, it also includes the online interface that links to a web brokerage application. That application then allows the client to buy or sell the stock/option by clicking on the appropriate button(s), hyperlink(s), or control(s) in the interface included in the e-mail. By using the interface, the client can also request other information (e.g., stock price history) which can be displayed in a Java applet or as a dynamically generated HTML/XML/WML page.

2. Billing Interface

In yet another embodiment of the present invention, an enriched e-mail message is sent out to bill for services rendered. The interface included in the e-mail enables the user to perform one or more of the following actions: pay the bill electronically, update/change account information and services, call customer service, and access an online billing calculator.

The actual bill is generated by an electronic Billing server and then passed to a server process which creates a multi-part MIME e-mail. The bill is included as an HTML/XML/WML attachment. This attachment contains a statement of the actual bill, but will also have URL links embedded within the bill (or a similar data passing mechanism) which can pass customer account information to the server. For example, if the bill is attached to the e-mail as an HTML attachment, URL links can be embedded within the HTML that contain name/value parameters designed to pass customer account information to the server when the link is invoked. Such a mechanism allows for unique identification of a submitting party when a request to the back-end server is made. For example, the server may receive the "Pay Bill" request for customer "XYZ123" in the form:

www.tpsinc.com/UCServer/paybill?cid=XYZ123&billid=4598732 where "cid" and "billid" are the customer and billing identification tags, respectively. Accordingly, the server extracts from its database the billed amount and the bank account to debit for customer "XYZ123." The server then sends a debit request to the bank with the customer's bank account number and reports the result of the request to the customer through a Java applet or via a dynamically generated page. Using this technique, the application can also incorporate the ability for the customer to retrieve the current account balance and billing statement (as of the current time and date) and have the option of submitting an account settlement on all or part of it.

For additional security, a login mechanism can be incorporated which forces the user to login to the billing system before performing any transactions or account updates. This can be done via a browser cookie mechanism as discussed below. The server can save state between client requests by storing session information in a file that can be recalled and modified as needed.

3. Advertising Interface

In a third alternate embodiment, an interface is included in an enriched e-mail designed to advertise a travel vacation onboard a cruise ship. The promotional e-mail is sent to potential customers who, upon receiving it, may interact with the user interface to request information about the ship, including a cabin plan showing what cabins are currently available and at what price. The customer can then reserve the room and electronically make payment. Once the user is signed up, the cruise line can then send, via a subsequent enriched e-mail, other information about onboard events and activities (as they become available). Using the embedded user interface provided in the subsequent messages, the user can sign up for those events. The interface can even provide a current schedule and profile information that lets the user see how this new event relates to other events for which he or she previously registered.

Each of the above examples demonstrates the extended functionality and power gained in sending an enriched e-mail message (including a user interface) as compared to a conventional text only e-mail message. Like conventional text e-mail, enriched e-mail allows the sender to "push" information and content to the user, thus, making it ideal for notification and alert messages. Enriched e-mail messages as defined here, however, rely on a user interface for a web-based application or applet to enable a user to interactively and dynamically respond to the e-mail in a service-specific fashion.

Turning now to FIG. 2, FIG. 2 shows an exemplary embodiment of a user interface according to the present invention. This user interface, and its server side components provided by a UC server, provide unified communication services including:

Playback and viewing of voice, fax, and video messages.

Placing phone or video calls directly from the interface.

Forwarding the received message to one or more parties.

Managing and setting up a phone or video conference.

Configuring and Setting-up a user's account through the interface.

Accessing a user's World Wide Web information.

Displaying system and account status within the interface in a timely fashion.

Carrying current or up-to-date information independent of when a message was actually sent.

As used in this application, the term "non-literal" message means (1) a message that is not text-only or (2) a message that needs to be played (e.g., a voice clip) or rendered (e.g., an image, including facsimile). Forms are contained within the definition of a non-literal message since the forms may include elements (e.g., hyperlinks and buttons) that are not strictly text-only. Non-literal messages can be self-contained or include hyperlinks, and they may be delivered in one piece or in several pieces (e.g., in a streaming fashion).

Accordingly, when a UC server sends an e-mail to a subscriber, the e-mail contains interaction controls (e.g., buttons or Universal Resource Links (URLs)) which give the subscriber the ability to interact with server side communication functions (e.g., perform conference calling and message retrieval). The interaction controls are sent with the e-mail as part of an HTML, WML or XML document which is attached to the e-mail (e.g., as a MIME attachment) in the form of a graphical user interface. The actual voice, fax, or video message is preferably stored on the server computer until the user requests it. On the other hand, a message can be attached to the e-mail so that it is downloaded with the HTML or WML document to the subscriber's computer.

By leveraging the rendering capabilities of e-mail programs, a rich graphical HTML interface is provided when rendering an e-mail. Below is step by step analysis of one embodiment of a method of sending a subscriber notification—specifically a notification that a voicemail message is in the subscriber's unified messaging mailbox.

1) When a caller leaves a voicemail message for the subscriber, the message is stored digitally on the computer(s) of the UC service provider.

2) The UC service provider then sends, via e-mail, a standard MIME encoded (or similar) document to the subscriber which contains at least one part. The first part is a standard HTML, WML or XML formatted document which contains interaction controls (e.g., URL links or form elements) linked backed to at least one server side program. When one of the interaction controls is selected, a message is sent back to the server causing the server to perform a corresponding one of the communication services. As described above, the MIME-encoded e-mail message also can contain, if the user prefers, the actual multimedia portion of the message attached as a separate MIME part to the e-mail so that the subscriber can listen to or view the message off-line (i.e., without a network connection).

3) Once the recipient receives the e-mail message and opens it, the recipient sees the graphical HTML, WML or XML attachment either directly in an e-mail client or in a Web Browser depending on the system configuration. Moreover, once the e-mail is opened, a communications connection (e.g., a Hyper Text Transfer Protocol (HTTP) connection) is established to an information server (e.g., a Web Server) which immediately loads images, data, or programs (like a Java applet or similar) necessary to construct the interface to be displayed. This interface may even provide current up-to-date information which is newer than the time and date the e-mail was originally constructed. The message identification (as well as other system parameters needed to retrieve the message) is also contained in the MIME message.

4) After opening the e-mail message, the subscriber is presented with a graphical user interface which can (1) retrieve the subscriber's message and (2) coordinate other communication services. The interaction controls also can load information dynamically and automatically into the document once the e-mail is opened (i.e., without requiring explicit user action after opening the e-mail).

5) Once the subscriber is finished with the message, the subscriber may delete the message like any other e-mail message. However, if the subscriber chooses to keep the message in the e-mail client, the subscriber will still be able to see up-to-date information (e.g., like the status of an account) when the message is opened again. This occurs because all time sensitive information is loaded dynamically each time the e-mail message is opened.

Thus, the present invention uses an Enriched E-mail interface to interact with phone, fax and video services from inside an e-mail message. Also, with such an e-mailed based interface, the subscriber can "push" information to another user. The pushed information can include one or more of any of the following:

message data (voice, fax, video)
current status info on:
  the fact that phone availability is turned off
  the current primary number location of a subscriber
  any overrides that are in effect
service information
account information
other information (stock quotes, sport scores, current events)
new product info, special discount rates Dynamic Information In one embodiment of the present invention, the Enriched E-mail interface has sections which contain dynamic information (e.g., 203) which are always current even if the actual e-mail message is old and has been in the subscriber's mailbox for some time. This is possible since the dynamic information is kept on the UC server computers until the e-mail HTML interface requests it in response to a subscriber opening the e-mail. The three embodiments include:

(1) Clients that use Image URL links to reference a CGI program which returns a dynamically constructed image which contains the current information. The image is retrieved every time the HTML page is opened or refreshed.

(2) A Java-based HTML e-mail applet that retrieves the current information from the UC server and then displays it.

(3) Embedding a Javascript "onload" event handler in the "<body>" tag of an HTML page. When the page is loaded by the client the Javascript function which the "onload" event handler references is executed. This allows for dynamic retrieval of information at the time the web page is viewed. An example of such a function call is shown in the HTML code fragment below:

<BODY onLoad="getCurrentInfo(custID);"> where getcurrentInfo( ) is a function which takes a unique message or customer identifier to call a URL that retrieves current information.

Figure 3:
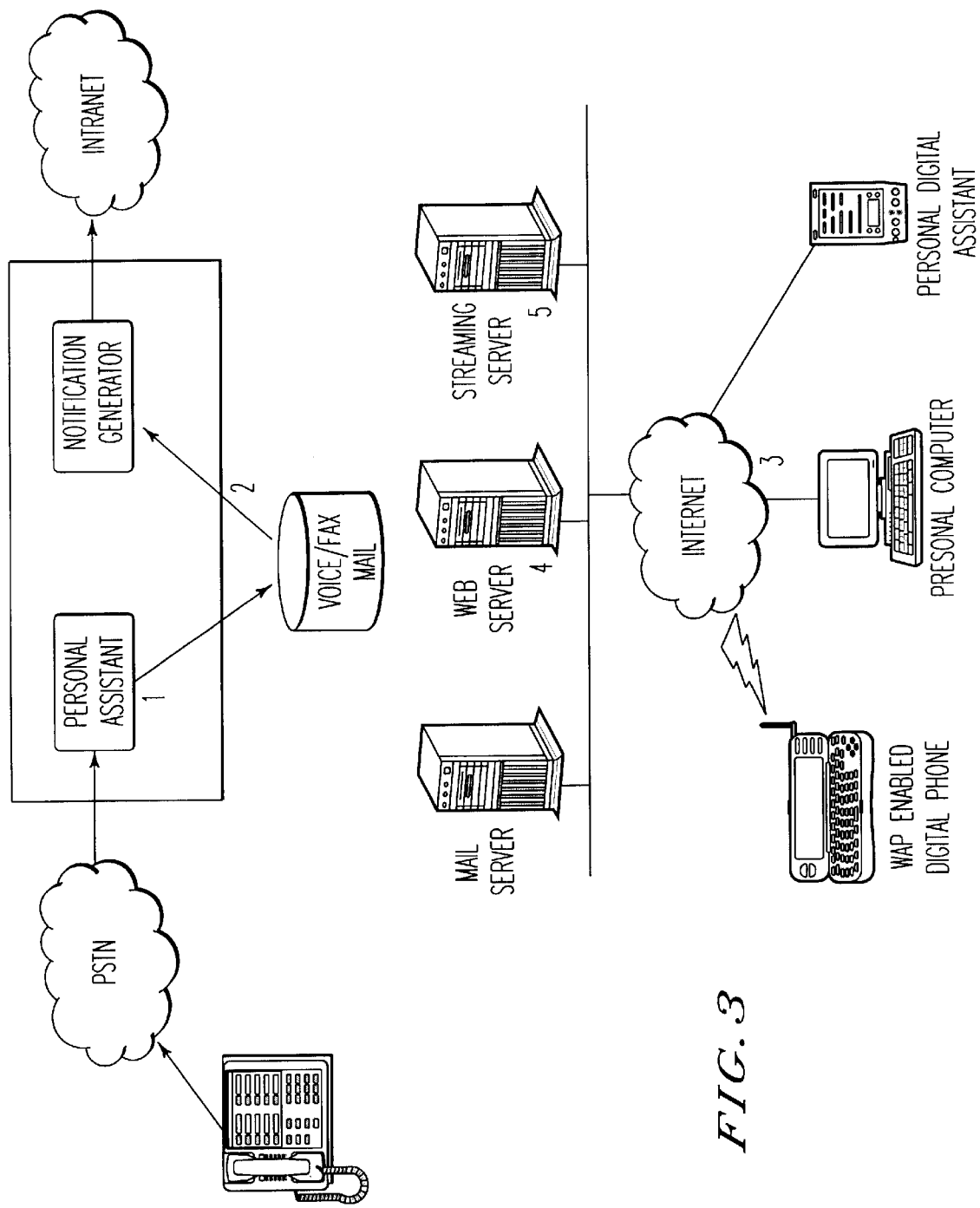
FIG. 3 is a block diagram of one embodiment of the components of the present invention.
Figure 4:
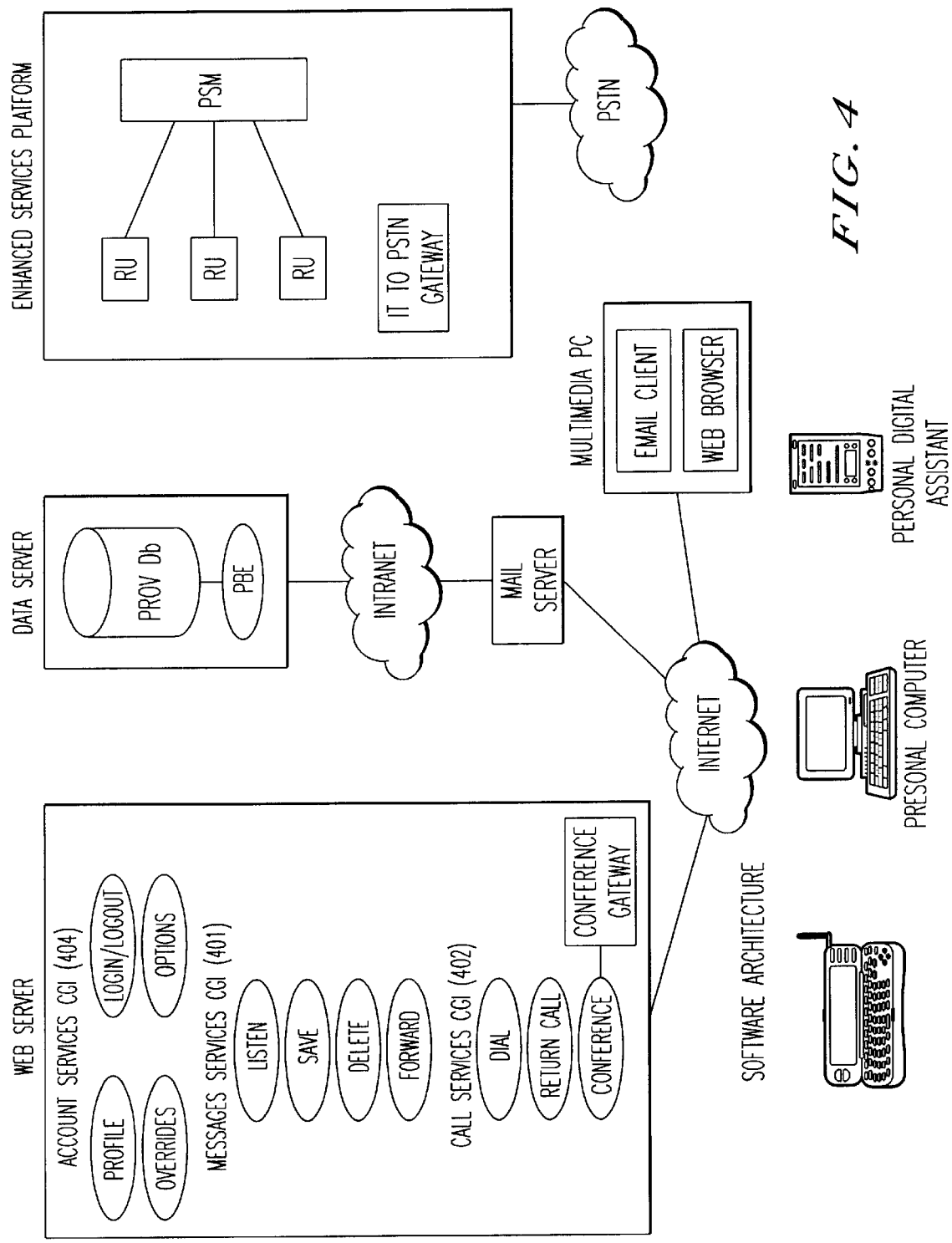
FIG. 4 is a schematic illustration of one embodiment of the software components for implementing the method of the present invention.

In one implementation, the information in any of the three embodiments is constructed from at least one dynamic source (e.g., account, status, or message information) on the enhanced services platform as shown in FIG. 4. In an alternate implementation, the dynamic information is imported from a third party source (e.g., news agency or brokerage house) and then integrated into the Unified Call Management environment as shown in FIGS. 3 and 4.

Message Delivery

The Enriched E-mail interface also is capable of sending a multimedia E-mail Message over a wide-area network (e.g., the Internet) via standard e-mail which can be viewed, listened to, or read without requiring that the recipient have an installed message-specific application to interpret the message's data. The only software needed is a Java-enabled Web browser or e-mail client that runs a small Java applet. That applet retrieves, plays, and displays the data that the applet downloads from the UC server computer. This allows the recipient to "interpret" the data without the need for additional software beyond a standard Java-enabled e-mail client and/or Web browser. Even if the message is encoded and compressed in a non-standard format, the Java applet which subsequently gets downloaded when the message is requested can decode the data before displaying or playing it.

The present invention can be used for any type of data format (e.g., voice, fax, video). The present invention:

(1) does not require the user to have the "application" software installed on their hard disk; and (2) enables large voice, fax, and video messages to reside on a central server and to be streamed to the recipient without requiring that the recipient download the entire message (which can be time consuming) before it is played/displayed.

Message Services

The message services 201 which are provided in the interface give the user the ability to Listen, View, Save, Delete, or Forward a message from the interface. These services are performed by the interface connecting to an information server (e.g., a Web server) that invokes an application (e.g., a CGI script 401) that then invokes other processes on the enhanced services platform to carry out the request (FIG. 4). The listen and/or view processes work in two modes: (1) local mode where the message data is contained in the email and is accessed directly, or (2) streaming mode when the message data resides on the Enhanced Services platform (FIG. 4.) and is downloaded via streaming technology to the user.

When the user selects the "Listen/View" link for a voice message, the interface makes a request on behalf of the user to a Web Server 410 including an HTTP CGI "listen" program or script 401. This program 401 determines the user's preferred audio format for playing back the voice message and delivers the voice message using the user's audio format preference (e.g., a .wav format or a steaming audio format such as GSM or Realaudio). Streaming audio technology provides significant performance improvements in cases where the connection bandwidth between the interface and the Web Server 410 is low (56 Kb or less). In .wav format, the entire message is downloaded from the Web Server to the interface before the message starts playing. The .wav audio message is played by a media player application that comes standard with Web Browsers. In audio streaming format, the message is played as it downloads from the Web Server to the interface. A streaming player such as the Call Sciences GSM Audio Streaming Player or the RealNetworks RealAudio Player can be used to listen to voice messages in steaming audio format.

When the user selects the "Listen/View" link for a FAX message, the message services CGI 401 is used to deliver the voice or fax (e.g., in TIFF or GIF format). The interface invokes a "fax viewer" application such as the Wang Imaging Viewer (standard with Windows 95/98/NT) to render the fax image.

When the user selects the "Save" link, the interface sends a request to a CGI computer program 401 residing on the UC Web Server 410 on behalf of the user. This program sends a "save message" request to a computer program running on one of the computers on the Unified Mail System platform 420. That program changes the status of the message in the user's mail box from "new" to "saved".

When the user selects the "Delete" link, the interface requests that the HTTP CGI computer program 401 residing on the UC Web Server 410 send a "delete message" request to the Unified Mail System platform 420. That program removes the message from the user's message mailbox.

When the user selects the "Forward" link, the interface requests that the CGI computer program 401 residing on the UC Web Server 410 generate an HTML/XML/WML based-web page that contains the user interface for forwarding a voice or fax message. That interface provides features such as:

Forward a voice or fax message to one or more e-mail addresses.

Forward a fax message to one or more fax machines.

Send a carbon copy of the voice message or fax message to the user's e-mail address that is initiated in the forward request.

When the user selects the "Options" link, the interface requests that the Account Services CGI computer program 404 residing on the UC Web Server 410 generate an HTML/XML/WML-based web page that contains the user interface that allows the user to add/modify various UC service options. Options include an audio format preference (e.g., .wav, .gsm, or realaudio).

When the user selects the "Help" link, the interface invokes a new window and requests that the Account Services CGI program 404 residing on the UC Web Server 410 deliver online help content via HTML/XMA/WML inside the newly created window.

Call Services

If a user wants to place a phone or video call, he/she can do so in at least two different ways using the embedded interface.

(1) The user enters a call back phone number and a target phone number in the interface. The entered number is sent to the UC server which calls back (using the public switched telephone network (PSTN)) the user at the entered call back phone number. After the user answers the call, the UC server then calls the other party at the target phone number. In effect, the call established by the UC server is a private two way teleconference. This method, however, requires separate or independent data and voice connections.

(2) The user enters a phone number and then a local client program actually sets up a voice connection with the UC server to route the call from the PSTN switch on the server to the client via the network connection that the computer is using. This alleviates the need for the user to have a separate phone or video calling device when trying to make a phone or video call. The user's computer becomes the conduit for communicating with the other party.

Calling services 202 which can be provided through a user interface:

1) Return call—The user receives an e-mail message containing a user interface that indicates that the user missed a call and was left a voicemail. The user then clicks on a button, to call back the party. Clicking the button causes the interface to send a request to the web server 410 thereby invoking the "return call" Call Service 402 CGI script. If caller ID was available when the messaging service recorded the missed call, the messaging service will have captured the number of the calling party. Thus, the number can be passed to the "return call" Call Service 402 CGI script. If caller ID was not available, the subscriber is prompted to enter the number to use to call back. The number can be selected from the interfaces phone book or entered manually. The CGI script will make a request to the Enhanced Service Platform to create a two-way call between the subscriber and the party that left the voice message. In the PSTN-to-PSTN case, the Enhanced Services platform will call the subscriber first. Upon connecting, successfully, the Enhanced Services platform calls the party that left the voicemail message. If the called party picks up, the call is bridged between the subscriber and the called party. The return call can also be carried out using the Internet Telephony (IT)-to-PSTN Gateway, when provided on the Enhanced Services Platform.

2) Place a Call—The sequence for placing a call is similar to the sequence for returning a call. The user clicks on the "Place a call" button on the user interface. The subscriber indicates the number to be called by using his/her phone directory or entering the number manually. When the button is clicked, the "dial" Call Services CGI 402 script is invoked. The CGI script makes a request to the Enhanced Services Platform to create a two-way call between the subscriber and the phone number that was entered. This call can be carried out PSTN-to-PSTN or IT-to-PSTN.

3) Call Me back now—When a "call me" button is clicked on the user interface embedded in the enhanced e-mail, the Call Services CGI 402 script makes a request to the Enhanced Services Platform to call the subscriber at a number entered/selected by the subscriber. When the subscriber answers the call, the Enhanced Services Platform prompts the subscriber to enter his/her Personal Identification Number (PIN). On successfully entering a valid PIN, the subscriber can use all the DTMF features available with the enhanced services to which he/she has subscribed.

4) Listen by Phone—Similar to the "Call me back" option, the interface includes a "Listen by Phone" button. When that button is clicked, the Call Services CGI 402 script makes a request to the Enhanced Services Platform to call the subscriber at a number entered/selected by the subscriber. The request includes the message ID of the message that was displayed when the user clicked the button. When the subscriber answers the call, the Enhanced Services Platform plays, to the subscriber, the voicemail message corresponding to that message ID.

5) Phone Conference—A conference between two or more people, may also be initiated via the interface. The teleconference may either be conducted over the PSTN or over the Internet (e.g., using voice over IP). When the conference button is clicked, a conference user interface will be presented to the subscriber. The conferencing user interface uses the "conference" Call Services CGI 402 script to create and carry out the conference with at least one person. The "conference" Call Services CGI 402 script creates a conference, deletes a conference, adds conferees, and drops conferees via the "conference gateway". The conference gateway uses the Enhanced Services Platform to interface with the PSTN (using a Telephony Switch or a Programmable Switch Matrix (PSM)) or the IT-to-PSTN Gateway. The IT-to-PSTN Gateway interfaces with the PSTN using the PSM. Additional details of how to set up an N-way phone conference by either linking to such a service or by providing such capabilities directly in the Enriched E-mail message are described in co-pending application Ser. No. 08/806,986, filed Feb. 26, 1997, entitled "Personal Web-Based Teleconferencing Method and System."

Phone Directory Support:

The interface will enable the user to utilize a personal directory and a corporate directory for phone numbers and e-mail addresses. The directory can be used when making a call or forwarding a message to another person. The directory is activated by clicking on the phone book icon.

Setup and Configuration

The interface allows the user to setup and configure a corresponding enhanced services account., including routing schedules for voice, fax, e-mail, and video calls and messages. The setup and configuration options that are available depend on the enhanced services to which the user subscribes. The enhanced services include, but are not limited, to:

voice, fax, video mail
  find me/follow me services
  call diversion
  call screening
  text-to-speech conversion
  automatic speech recognition
  conferencing
  broadcast fax and voice messaging
  unified messaging and communications
  calling card The setup and configuration links 204 shown in FIG. 2 allow a user to manage UC services without requiring the aid of customer service representatives. With these links, a user can temporary set overrides (e.g., defer all calls to a specific number for N hours), manage a service profile, and login/logout from the interface.

When the user selects the "Overrides" link in section 204 of the interface, the interface requests a new "overrides" interface from an HTTP CGI script or program 404 on the UC Web Server 410. The new "overrides" interface (an HTML/XML/WML user interface) is rendered in the same or a separate window and allows the user to temporarily override settings such as: availability and call screening, fax store/forward options, fax location number, and voice location number. Actions initiated from this interface are propagated back to the Unified Mail System platform through at least one message.

When the user selects the "profile" link in section 204 of the interface, the interface requests a new "profile" interface from an HTTP CGI script or program 404 residing on the UC Web Server 410. The new "profile" interface (also an HTML/XML/WML user interface) is rendered in a separate window or the same window and allows the user to manage a corresponding UC user profile. This "profile" interface manages UC profile information such as: voice location schedule, availability/call screening schedule, contact telephone numbers (voice/fax), text-to-speech settings, and e-mail notification options. Actions initiated from this "profile" interface are stored in the UC database and propagated to the Unified Mail System platform.

Similar interfaces are generated when the user selects either the "login" or "logout" options in section 204 of the interface. Authentication (as described with reference to FIG. 6) is performed by the corresponding "login" CGI script or program. When the user selects the "login" URL link in section 204 of the interface, the "login" user interface is generated from an HTTP CGI script or program 404 residing on the UC Web Server 410. The "login" user interface (also an HTML/XML/WML user interface) is rendered in a separate browser window or the same browser window. The "login" user interface is also presented to the user in cases where any "button" (e.g., Profile) or "URL link" (e.g., Place A Call) is clicked from the UC e-mail user interface, and the user has not yet completed the login (authentication) process (or has been automatically logged out after inactivity). This security feature prevents unauthorized access to the UC services.

The "login" user interface provides data entry fields for the UC service id (e.g., UC service number) and the UC service Personal Identification Number (PIN). Once a user (1) enters his/or authorization information (e.g., UC service id and PIN) and (2) clicks on the submit button (e.g., HTML submit button), a request (e.g., an HTTP POST request) is sent from the interface to the HTTP CGI "login" program 404 on UC Web Server 410. The request contains the user's authorization information (UC service id and PIN). The CGI "login" program sends a query request message to the UC Data Server (Provisioning Back End (PBE)) program (shown in FIG. 4) using the UC service id as the query field. Upon receiving the query request message, the PBE program queries the database using the UC service id and returns the user's UC service record to the CGI "login" program as a response message. If the query fails, an error response message is sent back to the CGI "login" program. The CGI "login" program receives the response message and presents an error message to the user if the query fails. If the query succeeds, the PIN will be validated against the PIN provided in the user's UC service record. If the PINs do not match, an error message is presented to the user. The user is given the opportunity to retry the login process.

If the PINs match, the CGI "login" program creates a login session using UC Service Id, time stamp, and process id as the session identifier and sets a Netscape Cookie on the user's computer. (Additional information on Netscape Cookies is available in W3C RFC 210, incorporated herein by reference.) The Netscape Cookie is set by providing a name and a cookie value (e.g., CookieName=<UC Service Id>|<Time Stamp>|<Process Id>). In addition, a cookie expiration date is set to support an extended login. The "extended login" keeps the user's login session active for a configurable amount of days (e.g., 14 days). The Netscape Cookie mechanism is used to maintain a login session between the user and the UC services platform. Each time the user initiates an interaction with the UC services via the e-mail user interface, the Netscape Cookie is sent as part of the HTTP request to the UC Web Server 410. The cookie value is correlated back to the login session identifier. If the login session identifier exists on the UC Web Server, requests (by clicking on a URL link or button) initiated from the UC service user interface embedded in an e-mail are processed by the UC service. If the login session identifier does not exist, requests from the UC service user interface are rejected. On rejection, the CGI 404 services will provide the user with a "login" user interface.

A UC user interface "login" session is terminated by using the "logout" URL link or when the Netscape Cookie's life expires (based on the Cookie expiration date). When the user clicks on the "logout" URL link in section 204 of the interface, the "logout" HTTP CGI script or program 404 will set the Netscape Cookie to expire by setting the cookie expiration date and time to a date and time in the past (e.g., Jul. 4, 1961) and by deleting the login session identifier. Once the Netscape Cookie expires, the user must re-execute the login process to establish another UC user interface login session.

Quick Overrides and Shorts Cuts

The quick overrides section 205 of the interface provides a set of customized short cuts (e.g., links) that enable the user to perform tasks such as:

overriding a call forwarding location to number X for N hours;

turning caller screening on or off;

indicating that a subscriber is unavailable; and removing all previously set overrides.

The shortcuts available are customizable by the user using the "options" button. By selecting any of the shortcuts, the interface requests that the enhanced services platform carry out the corresponding service through a request of an account services CGI 404 script or program.

Voice Activated Interface

Using voice recognition support for commands in e-mail and web browser clients, the e-mail interface described herein is controllable in two different modes: (1) using standard links and (2) using short speaker commands. For example, to dial a phone number, the user says "dial" followed by a name in the user's personal or corporate phone directory or by speaking the digits of the telephone number to be dialed. The same method can be used to return a call. In that case, the user says "return call". If a return number is present, the number will be automatically dialed.

Below is an exemplary, but not limiting, list of commands that can be activated via the speech interface:

access to profile access to overrides login logout listen, save, delete, or forward messages access to short cuts (quick overrides)

Synchronization of Electronic Mail and Information Stored in the Unified Communications Servers When the Unified Communications System sends a notification to an e-mail system with a copy of a non-literal message or a link attached, a synchronization problem is created. This occurs because a copy of or a reference to the message exists in two places. Automatic synchronization between the two systems eliminates the need for the subscriber to delete the message from two locations when it is no longer needed. This method allows a Unified Messaging view of (1) e-mail and (2) voice and FAX messages even if they do not share the same storage devices or locations. Accordingly, various Unified Communications and e-mail systems can be coupled together without storing all messages in a single location.

Using automatic synchronization, a first system notifies a second system when the message or notification is deleted from the first system. For example, when a voice or FAX message is deleted from the Unified Communication system, a message is sent to the e-mail system indicating that the corresponding e-mail notification should be deleted from the e-mail system. Similarly, when a voice or facsimile related e-mail notification is deleted from the e-mail system, the e-mail system ends a message to the Unified Communications system indicating that the corresponding voice or facsimile message should be deleted.

Each system uses a common globally unique message identifier to locate messages in the counterpart systems store. This ID is used to identify messages for deletion from or forwarding from the counterpart system.

Figure 5:
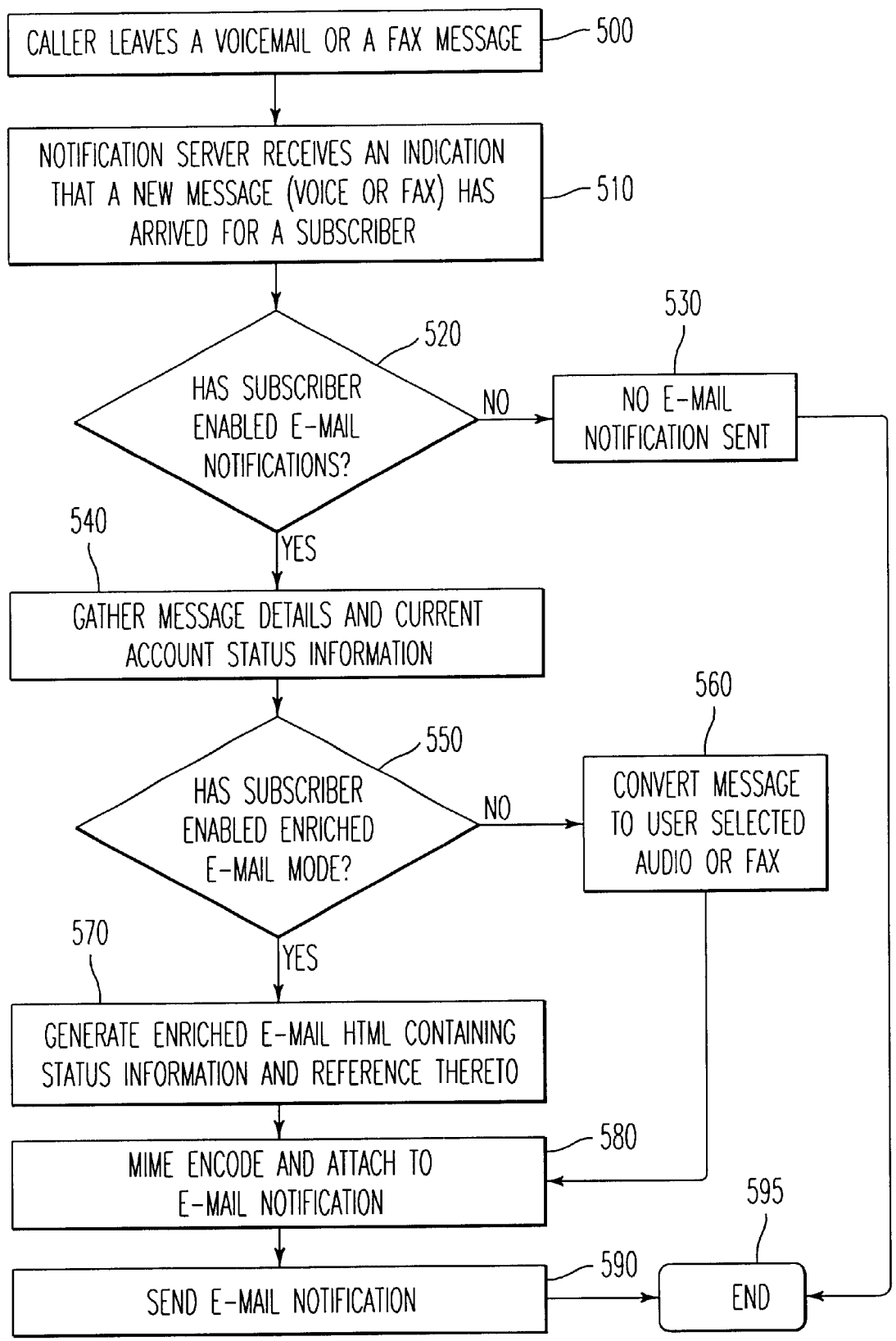
FIG. 5 is a flowchart illustrating the method of generating and sending a unified communications (UC) interface.

Turning now to FIG. 5, a description of the illustrated notification flowchart is provided below. In step 500, a caller calls a subscriber using a unified communications number. The caller leaves a voicemail or facsimile message. The UC system records the caller's message and stores it (e.g., in a file on the server in a 32 Kbps ADPCM digital audio format). The message is then moved to storage reserved for the subscriber's account and is stored along with additional header information that contains additional descriptive or administrative data. Examples of such descriptive or administrative data include, but are not limited to:

a header version;

a message identifier;

a message type;

a time that the message was received;

a message priority (e.g., normal or urgent priority);

a length of the message (in time, pages or any other measure);

a subscriber's phone number;

a sender's phone number.

a recording rate (for voice messages);

a facsimile format for facsimile messages; and a billing identifier.

After the message and the descriptive or administrative information has been stored in step 500, control is passed to step 510. In step 510, the message notification server receives an indication that the subscriber has a new non-literal message (e.g., a new voicemail or facsimile message). One method of performing step 510, is to utilize a the notification server that periodically scans a spool directory looking for files containing information about newly arrived messages. These spool files contain the following information: (1) a notification type, (2) a language of notification, and (3) a location of the message and its corresponding header.

In step 520, the message notification server uses the subscriber's profile information to determine if the subscriber has selected he/she receive e-mail notifications. If step 520 determines that e-mail notifications have not been enabled, then control passes to step 530. In step 530, the system recognizes that an e-mail notification is not to be sent. However, the system can send a non-e-mail-based notification. Such a notification may include a paging notification or a voicemail notification. After step 530, the system finishes it processing based on the message received and passes control to step 595 which indicates the end of processing.

If step 520 determines that e-mail notifications have been enabled, then control passes to step 540. In step 540, the system gathers the information about the message for which the notification is being generated. This includes message type, length, sender and at what time it was left. Subsequently, control passes to step 550 where the system makes a second decision. In step 550, the system determines if a subscriber has enabled receipt of enriched (or active) e-mails. If step 550 determines that enriched e-mails have not been enabled, the control passes to step 560. In step 560, the message is converted to a facsimile or audio format directly without using an active interface. The message is converted to the format preferred by the subscriber. For a FAX messages the supported formats are multi-page TIFF or PDF. For voice messages it can be AU, WAV, GSM, or RealAudio.

However, if step 550 determines that enriched e-mails are enabled, then control passes to step 570 which causes the system to generate an enriched email containing status information and a link back to the message. In one embodiment of the present invention, the e-mail is generated by merging message information and an HTML template. Regardless of the decision reached in step 550, after both steps 570 and 560, control passes to step 580. In step 580, the system generates an e-mail addressed to the subscriber's e-mail account. Such an e-mail can be formatted in any valid format; however, the preferred embodiment utilizes MIME encoding format. Lastly, in steps 590 and 595, respectively, the e-mail notification is sent (e.g., using the SMTP protocol) and the process ends.

Figure 6:
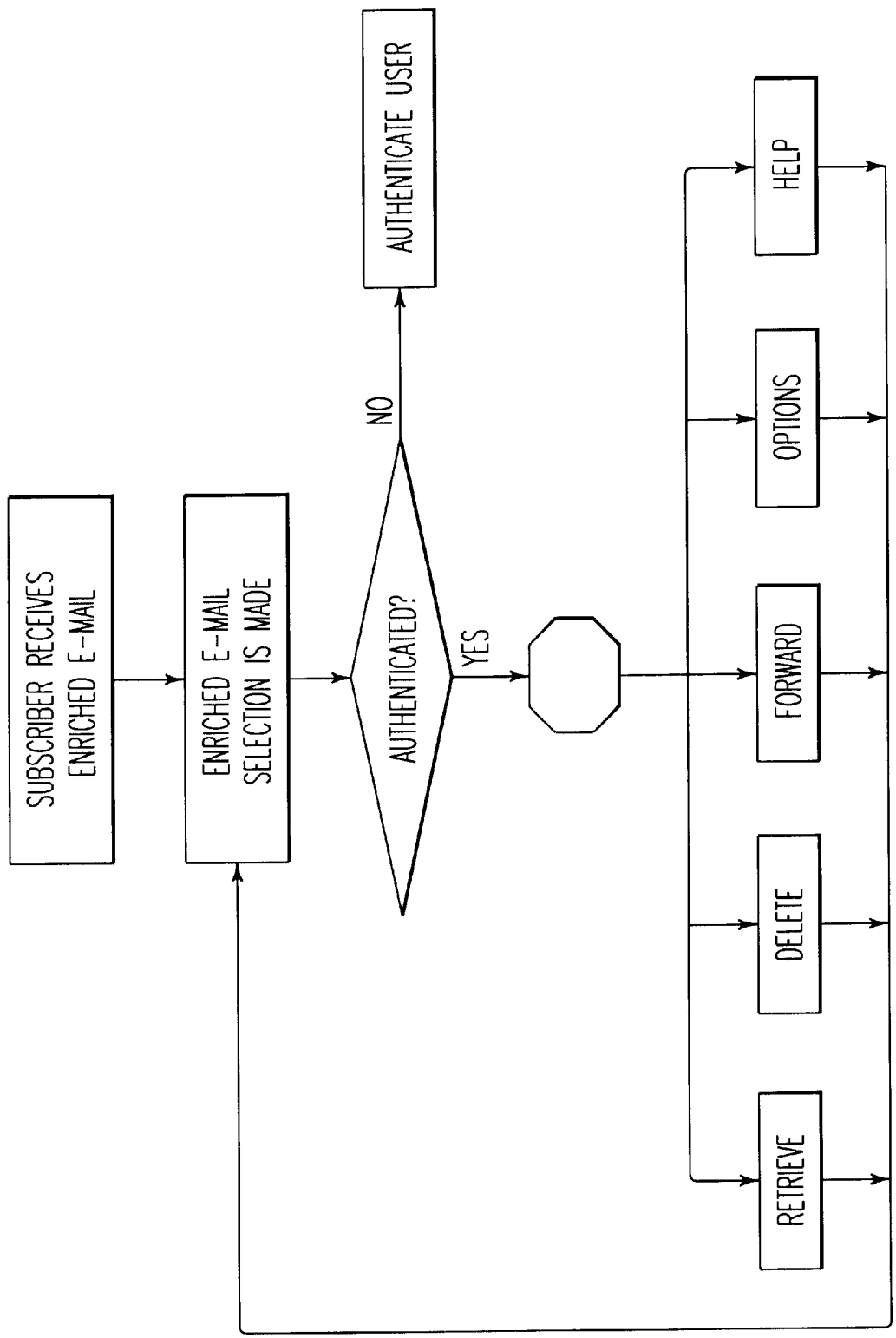
FIG. 6 is a flow chart illustrating an authentication process for use with the UC interface.

Turning now to FIG. 6, a description of the illustrated link creation flowchart is provided below. First, a notification is received by a subscriber in the subscriber's e-mail account indicating that a new message (e.g., a voicemail or a facsimile) has arrived. Secondly, the subscriber selects an action through the active interface (or the system automatically tries to retrieve confidential status information. If the subscriber is not authenticated already, the process is diverted to ensure that the subscriber is authenticated. (As described above, such a process requires that the user enter authentication information (e.g., a valid subscriber and PIN number combination).) Once the subscriber is authenticated, then, during the process of rendering the user interface in the e-mail client or browser, the current account information also is displayed. Independent of whether confidential information is to be displayed, the subscriber must be authenticated when the subscriber chooses one of the selections on the active interface. The system determines (represented by a hexagon in FIG. 6) which selection has been requested. Processing continues as described below for each of the illustrated selections.

(1) Retrieve (Listen or View)—A CGI script on the Web Server is invoked to initiate the download of a facsimile message or a streaming voice message. A FAX will be in multi-page TIFF or PDF format based on the subscribers' preference setting. Upon initiation of the download, the operating system of the access device will cause the appropriate program for viewing the message to be invoked. A voice message will be streamed in GSM or RealAudio format based on the subscriber's preference setting. The appropriate audio player will be invoked by the operating system of the access device for playing the message while it is being downloaded. This mechanism is referred to as "audio streaming".

(2) Delete—A CGI script on the Web Server is invoked which deletes the message from the Unified Communications System.

(3) Forward—This allows the voice or FAX message to be forwarded to a phone number or e-mail address.

(4) Options—A browser is used to present HTML pages that are used to access the subscriber's Overrides and Profile information.

(5) Help—A browser page pops up with help on how to use the active interface.

Obviously, numerous modifications and variations of the present invention are possible in light of the above teachings without departing from the intended scope of the present invention. For example, the voice messaging system used in the present invention need not be physically connected to the UC server but may instead be connected remotely through a communications network including one or more intermediate network components.

What is claimed is:

1. A computer program product, comprising:
 a computer storage medium and a computer program code mechanism embedded in the computer storage medium for causing a computer to control retrieval of non-literal messages referenced in a notification message, the computer program code mechanism comprising:
 a first computer code device configured to store a non-literal message sent to a subscriber identified by a unique identifier;
 a second computer code device configured to generate an e-mail notification with an embedded active interface referencing the non-literal message;
 a third computer code device configured to retrieve the non-literal message from the remote computer when requested by the subscriber through the active interface, wherein opening of the e-mail notification by the subscriber causes the non-literal message to be dynamically updated with any new information; and
 a fourth computer code device configured to selectively render the non-literal message from a user preferred audio format.

2. The computer program product as claimed in claim 1, wherein the fourth computer code device comprises a fifth computer code device configured to render the non-literal message in a streaming format.

3. The computer program product as claimed in claim 1, wherein the second computer code device comprises a fifth computer code device configured to link to a modifiable version of account and configuration information of the subscriber.

4. The computer program product as claimed in claim 1, wherein the non-literal message comprises a voicemail message.

5. The computer program product as claimed in claim 1, wherein the non-literal message comprises an active message indicating that an external event registered by the subscriber has occurred.

6. The computer program product as claimed in claim 1, wherein the non-literal message comprises an active message including at least one of news information and sports information.

7. The computer program product as claimed in claim 1, wherein the second computer code device comprises a fifth computer code device configured to dynamically update the active interface to display existing overrides of the subscriber.

8. The computer program product as claimed in claim 1, wherein the second computer code device comprises a fifth computer code device configured to provide interface controls representing short cuts for frequently performed tasks.

9. The computer program product as claimed in claim 1, wherein the third computer code device comprises a fifth computer code device configured to retrieve the non-literal message using a secure HTML request.

10. The computer program product as claimed in claim 1, wherein the second computer code device comprises a fifth computer code device configured to perform any one of:

(1) deliver a stored facsimile to a retrieval device specified by the subscriber;

(2) delete the non-literal message from storage; and (3) save the non-literal message into storage.

11. The computer program product as claimed in claim 1, further comprising a fifth computer code device configured to synchronize, plural non-literal message storage systems when the non-literal message is deleted from one of the plural non-literal message storage systems.

12. The computer program product as claimed in claim 1, wherein the second computer code device comprises a fifth computer code device configured to forward the non-literal message to any one of a phone number, a distribution list and an e-mail address.

13. The computer program product as claimed in claim 1, wherein the second computer code device comprises a fifth computer code device configured to provide two-way teleconferencing.

14. The computer program product as claimed in claim 1, wherein the second computer code device comprises a fifth computer code device configured to provide a return call interface for controlling a two-way teleconferencing bridge between two parties.

15. The computer program product as claimed in claim 1, wherein the second computer code device comprises a fifth computer code device configured to provide a call originating interface for controlling a two-way teleconferencing bridge between two parties.

16. The computer program product as claimed in claim 1, wherein the second computer code device comprises a fifth computer code device configured to control a telecommunications switch to call the subscriber to play the voice messages of the subscriber over a phone connection.

17. The computer program product as claimed in claim 16, further comprising a sixth computer code device configured to control the telecommunications switch to perform one of stopping a playing voice message, restarting a stopped voice message, fast forwarding a playing voice message and rewinding a playing voice message.

18. The computer program product as claimed in claim 1, wherein the active interface is implemented as a Java applet.

19. The computer program product as claimed in claim 1, wherein the fourth computer code device comprises a fifth computer code device configured to render the non-literal message in a visual format.

20. In a computer-based messaging system, a method of providing unified communication services over a network comprising:

storing a non-literal message sent to a subscriber identified by a unique identifier;

generating an e-mail notification with an embedded active interface referencing the non-literal message, the active interface including sections having dynamic information;

retrieving the non-literal message from the remote computer when requested by the subscriber through the active interface;

dynamically updating the non-literal message with any new information upon opening the e-mail notification by the subscriber;

enabling the subscriber to respond to a message through the active interface; and selectively rendering the non-literal message in a user preferred audio format.

21. The method as in claim 20, wherein the step of generating comprises generating the active interface to enable the subscriber to respond to a message through the active interface.

* * * * *

UNITED STATES PATENT AND TRADEMARK OFFICE
CERTIFICATE OF CORRECTION

PATENT NO.     : 6,549,612 B2
DATED          : April 15, 2003
INVENTOR(S)    : Gifford et al.

It is certified that error appears in the above-identified patent and that said Letters Patent is hereby corrected as shown below:

Title page,
Item [45] and Item [*], Notice information should read as follows:

-- [45]  **Date of Patent:   *Apr. 15, 2003**

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days. --

Signed and Sealed this

Twelfth Day of August, 2003

JAMES E. ROGAN
*Director of the United States Patent and Trademark Office*